Fig. 1.

A. B. NORRIS.
WOODWORKING MACHINE.
APPLICATION FILED MAY 27, 1909.

959,583.

Patented May 31, 1910.
5 SHEETS—SHEET 3.

Fig. 3.

WITNESSES:
Geo L Thom
M. J. Morton

INVENTOR.
A B Norris
BY
ATTORNEY.

A. B. NORRIS.
WOODWORKING MACHINE.
APPLICATION FILED MAY 27, 1909.

959,583.

Patented May 31, 1910.
5 SHEETS—SHEET 4.

WITNESSES:

INVENTOR.
A. B. Norris,
BY
ATTORNEY.

A. B. NORRIS.
WOODWORKING MACHINE.
APPLICATION FILED MAY 27, 1909.

959,583.

Patented May 31, 1910.
5 SHEETS—SHEET 5.

WITNESSES:
Geo. L. Thom
M. L. Morton

INVENTOR.
A. B. Norris.
BY Geo. E. Few
ATTORNEY.

UNITED STATES PATENT OFFICE.

ARTHUR B. NORRIS, OF ROCHESTER, NEW YORK.

WOODWORKING-MACHINE.

959,583.  Specification of Letters Patent.  Patented May 31, 1910.

Application filed May 27, 1909. Serial No. 498,597.

*To all whom it may concern:*

Be it known that I, ARTHUR B. NORRIS, citizen of the United States, residing at Rochester, in the county of Monroe and State of New York, have invented certain new and useful Improvements in Woodworking-Machines, of which the following is a specification.

This invention relates to wood working machines for shaping work, in which a cutter is guided by a pattern or templet, and comprises particularly a machine for trimming and shaping the toes and heels of shoe lasts, by cutting off the stubs left on the toes and heels of such lasts after they have been turned.

The object of the present invention is to form a machine which will do this work quickly and correctly, the stubs being cut off and the ends of the lasts shaped according to a pattern which controls the action of the cutters. As shown, the machine will simultaneously operate on a pair of lasts, the cutters being arranged for right and left or opposite movement to act on right and left lasts simultaneously. The machine is further characterized by improved means for guiding the cutters according to the pattern, as well as for supporting the work so that both ends thereof may be presented to the cutters without removing the work from the clamp in which it is held. So both the heels and the toes of the lasts may be shaped.

Various other improvements and novelties will be manifest from the following description and the accompanying drawings.

Referring specifically to the drawings, 1 indicates the hollow rectangular standard of the machine, having a base on which it stands. This is provided at the front with a vertical slide-way 2 on which the work holder moves up and down, and at the top with a horizontal slide-way 5, extending from front to rear. The slide-way 5 is made separate and bolted to the standard, as a matter of convenience.

Figure 1:
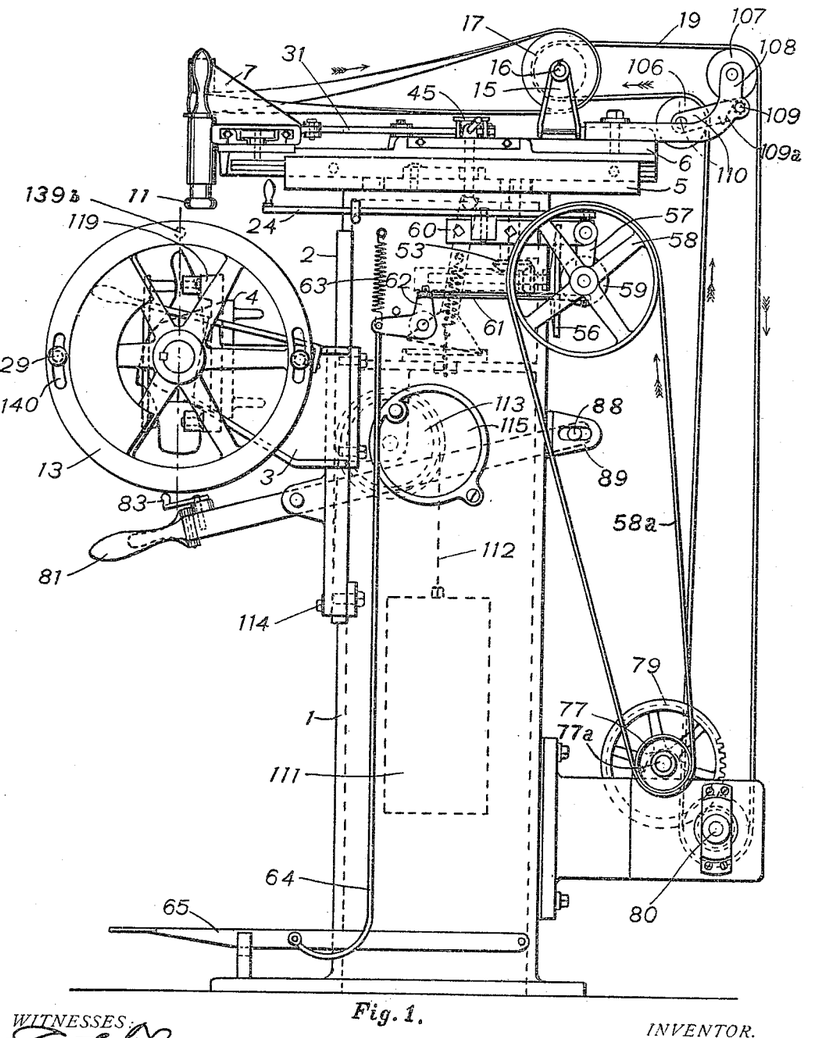
—Figure 1 is an elevation of the right side of the machine.
Figure 2:
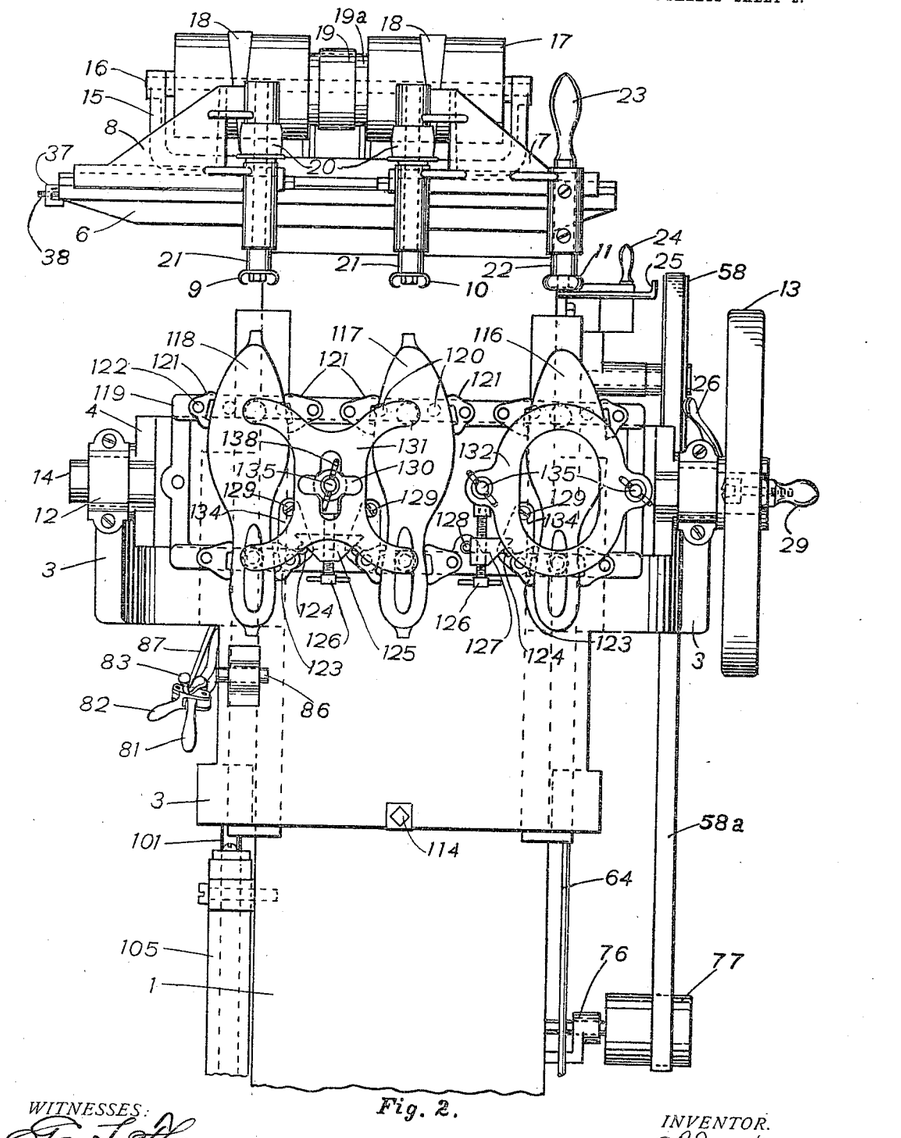
Fig. 2 is a front elevation.
Figure 3:
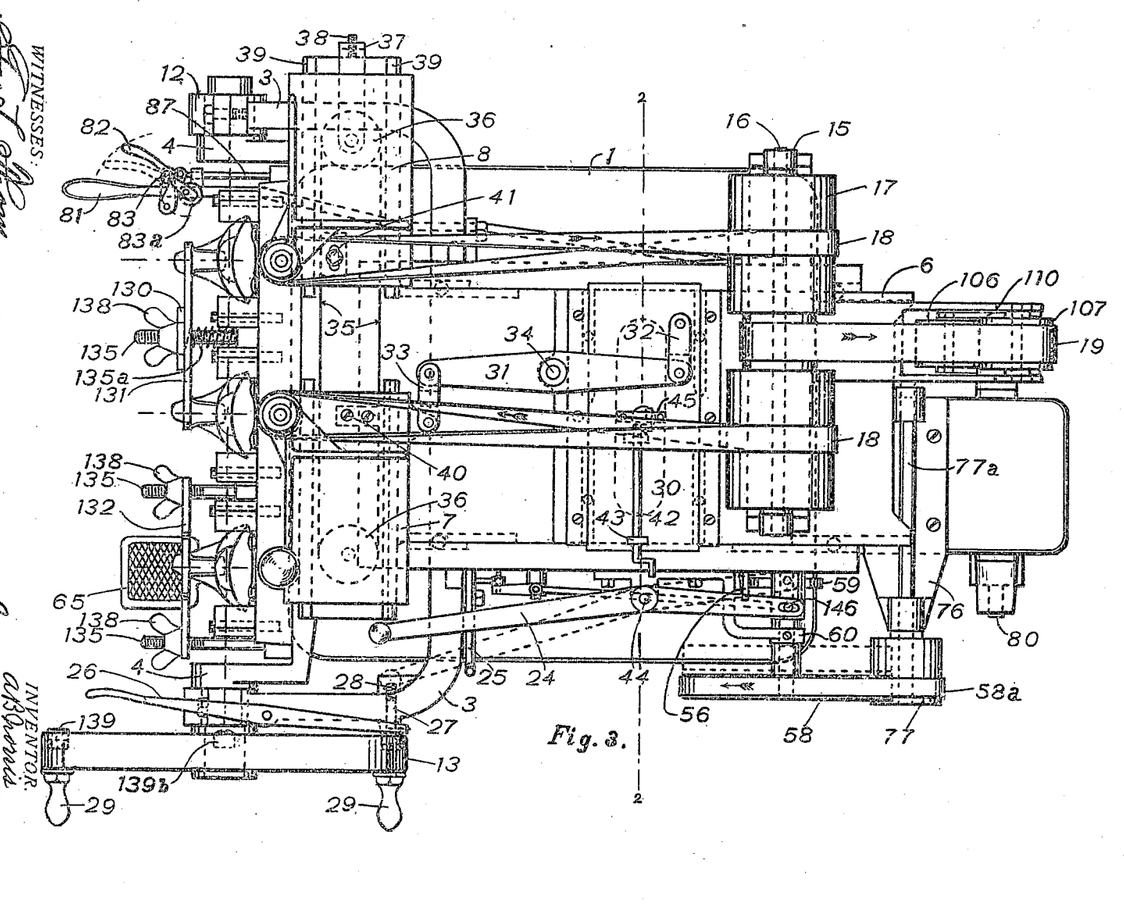
Fig. 3 is a top plan view;
Figures 8, 9:
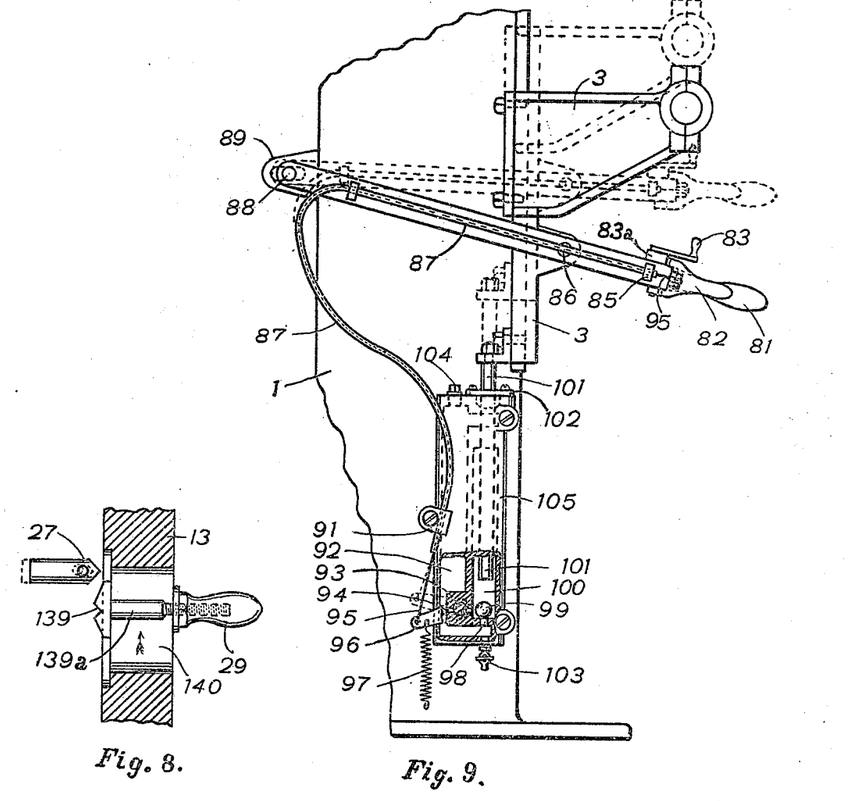
Fig. 8 is a detail in section showing the adjustment for the locking position of the lasts as they are presented to the cutters, incident to the difference in height of the toe and heel of various sized lasts which may be held in the work holder.
Fig. 9 is a partial side elevation, partly in section, of the machine, showing the lever for lifting the work holder and the means for controlling its descent.

On the vertical slideway 2 is mounted the slide or knee 3 which carries the work holding table 4. This table is provided at its ends with trunnions which turn in bearings 12 at the sides of the knee, so that the table may be rotated to present either end of the lasts to the cutters and also either end of the pattern to the form wheel. The trunnion at the right end of the table has a hand wheel 13 to permit of it being readily turned and to provide means for locking the same in the correct position. At opposite sides the hand wheel is slotted as indicated at 140, and adjustably located in the slots are pins $139^a$ which are fixed at adjustment by the handles 29 which screw thereon, and the heads of these pins are provided with notches 139 (see Fig. 8) which are engageable by a spring pin 27 set in a recess in the adjacent knee 3, and arranged to be released by a lever 26 connected thereto. In one position the table is located with the toes of the lasts presented to the cutters, and in the other position, produced by giving the wheel a half turn, the heels of the lasts are presented to the cutters. An intermediate notch $139^b$ is also provided in the rim of the wheel, to hold the table in horizontal position, which is convenient when the lasts are being placed in or removed from the clamps. The table 4 is offset from the axis of its trunnions, so that said axis will fall in line with the longitudinal axis of the lasts held thereon, as indicated in Figs. 1 and 3. The adjustable pins $139^a$ permit variation in position due to the difference in height of the toe and heel of various lasts.

The pattern last is indicated at 116, and the right and left work lasts at 117 and 118.

The pattern last is held to the plate 119 between upper and lower pivoted chuck blocks 121 and 123 pivotally mounted upon the bars of the chuck frame 119 so that they can adjust themselves to the shape of the last. The frame is fastened to the table 4 by bolts 136 and nuts 137. For each last, three of the pivot pins 122 of the blocks are fixed in the plate 119, and the fourth is carried by lever 134 pivoted to the holder frame at 129 and arranged to be pressed toward the last by a wedge block 127 mounted upon a screw 126 and arranged to press with its inclined face against a pin 124 on the link 134, to press the block 123 against the side of the last. The wedge backs against a pin 128 on the plate 119. The pattern last is also held under a ring plate 132 bolted to the holder frame, and this ring has inwardly projecting fingers (see Fig. 7) which press against the top of the last. The last rests against three spherical points 120, on the frame 119, of which points there are two at the toe and one at the heel.

The work lasts 117 and 118 are held in substantially the same way, except that the wedge block 125 on the screw 126 is made double instead of single in order to press both blocks 123 to the work, and instead of a ring plate a branched plate 131 is used, connected to the holder frame by a stud bolt 135 and wing nut 138, which bolt extends through a slot in the clamping plate and the nut bears on a button 130 to clamp the plate to the lasts. By loosening the thumb nut slightly the button 130 may be turned one quarter way around and then the plate 131 can be lifted off. A light helical spring 135$^a$ slipped over the stud between the button and the plate 119 serves to hold the button up in position so that when the plate 131 is again placed in position on the next pair of lasts it is only necessary to swing the button one quarter turn and tighten the thumb nut. At the end of each branch of the plate is an inwardly projecting finger, to bear against the last.

Figures 4, 5, 6, 7:
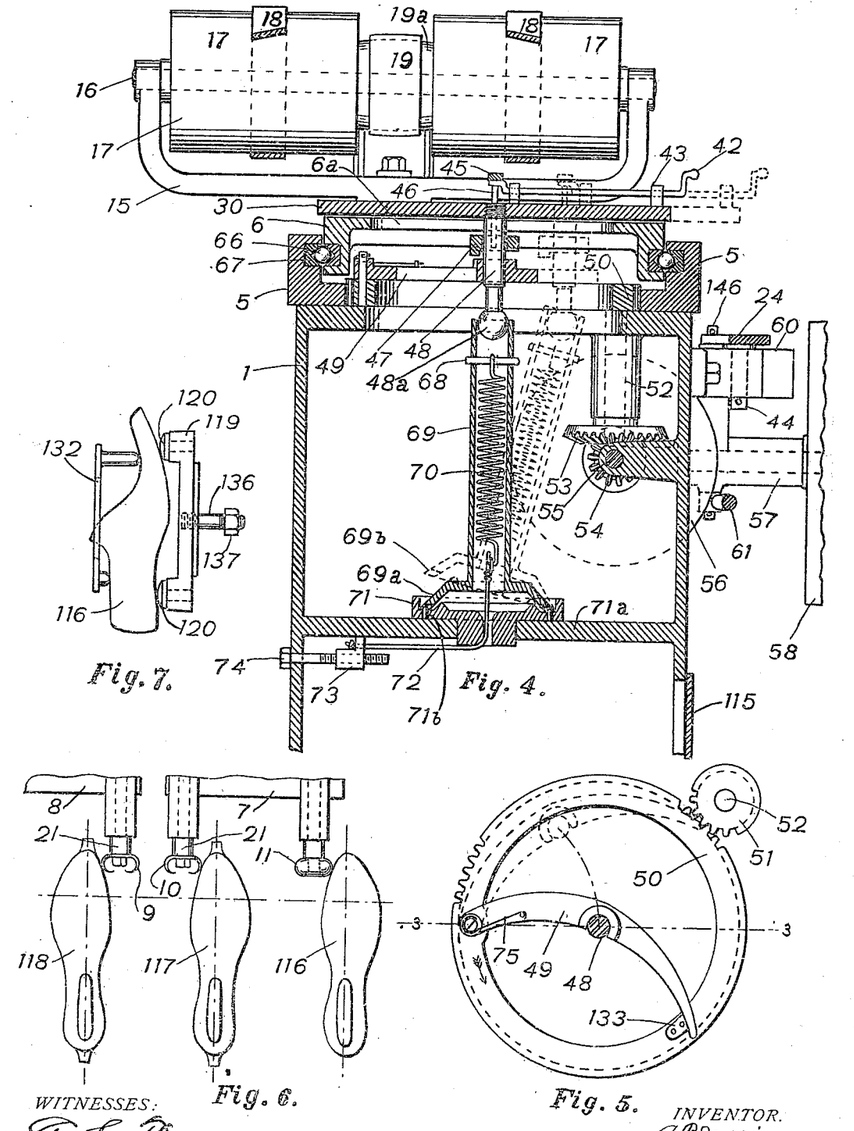
Fig. 4 is a section on the line 2—2 of Fig. 3.
Fig. 5 is a detail in plan of a ring gear and associated parts for operating the slides which control the position of the work.
Fig. 6 is a detail in front elevation showing the position of the lasts and cutters, and the pattern wheel and follower, at the beginning of the cutting operation.
Fig. 7 is a detail in end elevation of the clamp for holding the pattern.

The knee or slide 3, and the parts carried thereby, are nearly counterbalanced by a weight 111 located within the standard, and this is connected to the slide by a cable 112 passing over the wheel 113 and attached to the slide by a screw 114. The weight 111 being a trifle light, the knee and work holding parts carried thereby will descend by gravity, and in this connection it may be remarked that the cutters work from within outwardly, that is, they begin below the end of the last, as shown in Fig. 6, and cut toward the top as the work descends. The downward movement of the slide is controlled by a plunger 101 (see Fig. 9) working in a cylinder 100 fastened to the left side of the machine, said cylinder being formed within or constituting part of a larger cylinder or tank 105 which is provided with a filling hole closed by a plug 104, and a drain cock 103. The cylinder is provided at its lower end with a check valve 99 controlling the hole 98, and also with a by-pass valve 93 operated by a lever 96 which is connected to the lever 82 on the lifting lever 81 by a cable 95 inclosed by a flexible tube 87. The lever 81 is connected to the slide or knee 3 by a pin 86, and is fulcrumed at 88 in a slotted bracket 89 on the standard. When the slide is lifted by the lever the plunger 101 is withdrawn from the cylinder 100, and liquid in the chamber 92 of the tank flows through the hole 98, raising the check valve 99. When the plunger descends the check valve closes the hole 98 and the escape is then through the by-pass 93. This is normally closed by the spring 97 connected to the lever 96, and consequently the slide will remain stationary under such conditions. By pressing the lever 82 the by-pass will be opened, allowing the liquid to escape into the chamber 92 and consequently permitting the plunger and slide to descend. The cable 95 and its tube 87 are held by guide pieces 85 and 91, and the passage controlled by the by-pass valve 93 as indicated at 94. A minute adjustment of the by-pass is obtained by means of a lever 83 which operates an eccentric 83$^a$ bearing against the lever 82 and acting to shift said lever to the slight degree necessary to give a fine adjustment.

Figures 10, 11:
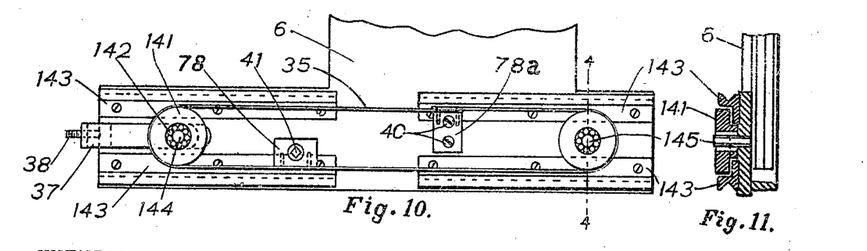
Fig. 10 is a detail in plan showing the connections for moving the right and left slides in opposite directions.
Fig. 11 is a section on the line 4—4 of Fig. 10.

The horizontal slide-way 5 at the top of the standard carries the forward and back slide 6, on which are mounted the pulleys and belts which drive the cutter spindles to be hereafter described. The front end of the slide 6 projects somewhat over the work holder, and at said front end are transverse slide-ways 143 in which are mounted the transverse slides 7 and 8. At the front edge the slide 8 is provided with an overhanging vertical bearing in which is mounted the left hand cutter spindle 21 and its cutter 9, and the slide 7 has likewise a corresponding vertical spindle 21 and its cutter 10, and the slide 7 also carries the pattern spindle 22 and its pattern wheel 11 which is of the same diameter as the cutters 9 and 10. The slides 7 and 8 move together forwardly and backwardly with the slide 6 by which they are carried, and they also move laterally or to the right and left in opposite directions in their guides 143, said right and left movement being simultaneous and equal. This movement is produced by the connections shown in Fig. 10, consisting of two pulleys 141 mounted upon the slide 6 and having a metal band 35 stretched around them. This band is held taut by a tightener 37 and its screw 38. Attached to this band are blocks 78 and 78$^a$, on opposite sides, the former being fastened to the slide 8 by a screw 41 and the latter to the slide 7 by screws 40. When the slide 7 moves to the right the slide 8 will, in consequence of the belt and its connections, move to the left, and vice-versa.

The pulleys 141 are mounted on roller bearings to reduce the friction, as are also the slides 6, 7, 8 and 30. This is necessary, for the cutter spindles must be free to move in any direction in the horizontal plane by a very light touch. The slides 6, 7, 8 and 30 are each carried on four balls, one at each corner, as indicated in dotted lines in Fig. 3 and as shown at 66 in Fig. 4, the ball races 67 being of steel, hardened and ground, and the balls having a four-point contact. The ball races will be protected by suitable covers (not shown) to exclude the dust.

The cutter spindles are driven from a pulley on the (electric) motor shaft 80 which drives a belt 19 passing over idlers 106 and 107 carried respectively by a bracket 108 bolted to the rear end of the slide 6 and by links 110 pivoted at 109 to said bracket, and thence the belt passes around a wheel 19$^a$ at the middle of a shaft 16 carried by a yoke 15 bolted to the frame 6. The swinging idler 106 is provided in order to accommodate the variation of belt travel incident to the back and forth movement of the slide 6 which varies, somewhat, the angle of travel of the belt. These parts constitute a belt tightener, the wheel 106 being held against the belt by a coiled spring 109$^a$ around the pivot pin 109.

The shaft 16 carries a pair of wide pulleys 17 which drive belts 18 extending around the same and around pulleys 20 on the cutter spindles, the belts being set to drive the cutters in opposite directions. The pulleys 17 are made wide in order to accommodate the lateral variation in position of the cutter spindles.

A treadle 65 is connected by a rod 64 to a bell crank 62 which is connected by a rod 61 to a swinging hanger 57 which carries a shaft having thereon a friction wheel 59 arranged to swing into and out of contact with a disk 56. The hanger 57 swings from a bracket 60, and a spring 63 normally holds the friction wheels out of contact. The shaft carrying the wheel 59 also carries a pulley 58 driven by a belt 58$^a$ from a pulley 77 on a shaft 77$^a$ mounted in a bearing bracket 76 and carrying a gear 79 which meshes with a pinion on the shaft 80. The friction disk 56 is mounted on a shaft 55 which extends through the wall of the standard and carries a beveled gear 54 meshing with a gear 53 the shaft 52 of which turns in a bearing in the top of the standard and carries a pinion 51 which meshes with a ring gear 50 located under the slide 6 and also under the transverse slide 30 mounted in guides thereon. The ring gear 50 rests and turns on the top plate of the standard, in a circular recess formed to receive it between the guides 5. Pivoted to one side of the gear 50 is a curved link 49 having in its concave side a notch which normally engages a stem 48 screwed into the cross slide 30. This slide 30 is connected to the cross slide 7 by a lever 31 the fulcrum 34 of which is located at the middle thereof, on the slide 6, and the opposite ends of which are connected by links 32 and 33 to the slides 30 and 7 respectively. By means of the lever, movement of the slide 30 in one direction is transmitted to the slide 7 in the opposite direction, and said movement is further transmitted by the band 35 into reverse movement of the slide 8. The stem 48 is normally drawn to the center of the ring gear 50 by means of the wabbling tube 69 and the spring 70 therein, the lower end of the stem having a ball 48$^a$ which fits in the top of said tube. The spring is connected between a cross pin 68 and a cable 72 attached to the nut 73 which travels on a screw 74 by means of which the spring may be adjusted. The bottom of the tube is enlarged and dished, as indicated at 69$^a$, and this enlarged part fits within a ring or cup bearing 71 mounted on a transverse plate 71$^a$ within the standard. The rim of the base 69$^a$ is notched, as indicated at 69$^b$ to engage pins or projections 71$^b$ in the cup 71, in order to prevent rotation of the tube 69 on its own axis, which might twist the spring or otherwise disarrange the parts. The link 49 is normally held to the center of the gear 50 by a spring 75, the stop block 133, on the gear, limiting the movement of the link in that direction. The extension of the link 49 which strikes said block 133 also prevents the stem 48 from working around onto the back of the link, as it might do if said link did not extend entirely across the ring gear. The function of the spring 70 is to tend to center all the slides, or bring the machine to normal position, as when the cutters and pattern wheel are out of contact with the work and pattern, for it is obvious that any movement either of the slide 6 back or forth, or of the slide 30, and its connected slides 7 and 8, laterally, will cause the tube 69 to tilt from its normal vertical position, such lateral tilt being indicated in dotted lines in Fig. 4, and such tilt is resisted by the spring 70.

It may be desirable to disengage the link 49 from the stem 48, when the machine is not running, as when setting up or adjusting the machine. This is done by the following means: On the stem 48 is a sliding collar 47 which may be raised or lowered by turning the crank handle 42 which is mounted in brackets 43 on the slide 30 and which engages at its cranked inner end under the cross piece 45 connecting the upper ends of rods 46 connected to the collar and working through holes in the plate 30. On the under side of the collar is a small projection, and as the gear 50 revolves this projection, when the collar is lowered, will strike the side of the hub around the notch in the link 49 and push it away from the stem 48, and as the gear continues to revolve the collar will drop still lower and prevent the link from hooking onto the stem until the collar is raised. The slide 6 has an opening 6ª to allow the movement of the pin 48, which is transverse according to the guided movement of the slides 7 and 30 as produced by the travel of the pattern wheel 11 around the pattern 116.

A speed lever 24 is provided, fulcrumed at 44 on the side of the standard and engaging a pin 146 projecting from the hanger 57 whereby said hanger and the friction wheel 59 carried thereby may be shifted over the face of the disk 56 in order to vary the speed at which said disk 56 is driven. A hand hole in the standard is closed by a plate 115.

In operation, the lasts 117, 118 and the pattern last 116 are clamped in the chuck or holder with the toes or heels approximately in line with the normal centers of the cutter and pattern spindles, which are then pushed to one side as the work is raised to the position to begin cutting, about as shown in Fig. 6. The necessary manipulation is conveniently performed by taking hold of the handle 23 on the pattern spindle, any movement of the slides being resisted by the spring 70, and when the work is raised to the proper position, about as shown in Fig. 6, the force of the spring 70 acting on the tube 69 will cause the pattern wheel and cutters to seek the centers and thus bring them in contact with the pattern and the work respectively, the work holding slide being raised by the lever 81, as above described. Then the by-pass valve 93 is opened by turning the lever 83, slightly, which allows the lasts to descend slowly, and at the same time the treadle 65 is pressed down, thus starting the feed drive which is communicated to the ring gear 50, causing the same to revolve. It will be understood that when the slides are moved away from the normal center the stem 48 will be moved away from the center of the gear 50, carrying with it the link 49, which thus becomes an automatically adjustable throw crank and draws the stem 48 around with it, assuming said stem is held away from the center of the gear 50, and it will be so held away while the pattern 116 holds the pattern wheel 11 away from its center. Inasmuch as the spring 70 is under constant tension, tending to move the spindles to their normal centers, the pattern wheel will thereby follow the irregularities of the pattern, and by means of the connections shown the cutters will describe the same movement, in reverse direction, however, in consequence of the opposite connection of the slides 7 and 8. And the movement of the slides necessary to cause the cutters to travel will be produced by the drag exerted through the ring 50 and link 49 on the pin 48 which, as stated, is connected to the slide 30 the movement of which is communicated to the slides 6, 7 and 8, the combined action of which allows a universal movement in a horizontal plane at a right angle to the axes of the cutter and pattern spindles. Said spindles, meanwhile, are driven on their own axes by the belt connections shown and described. The work lasts are thereby cut away according to the pattern, and the stubs at the end will be trimmed off as the work holder descends. When one end is trimmed the work holder is released by movement of the lever 26 and turned to reverse the work and present the other end thereof to the cutters, the work holder being then raised and the operation repeated. It may be observed that when the stem 48 is at the center of the gear 50 no motion is imparted to the slides, said gear simply traveling around the pin 48 as a center, carrying with it the link 49 which under such conditions has no action or function of a crank to drag or shift the pin. As the cutters approach the end of the toe during the operation described, the lever 24 may be moved to the right, causing the movement of the cutters around the work to be accelerated, which is desirable as the radius of gyration constantly diminishes until the end of the last is reached. As soon as the end is finished the cutter spindles return or reach their normal center, and the table is then quickly lowered to clear the cutters by pressing the lever 82 and opening the by-pass fully, and the table is then reversed to bring the other end of the lasts up.

The blocks 121 may be changed according to the shape or size of the lasts being operated on, in order to bring the centers of the lasts to the centers of the chuck. It is immaterial whether the pattern last is a right or a left. If a left model is used, then a left last must be placed in the center chuck and the right last in the other.

No limitation is implied by reason of the particular structures shown, since various modifications may be made within the scope of the invention. Nor is the invention limited to the work of trimming lasts, since it may be applied with or without modification to other kinds of work.

I claim:

1. In a machine for shaping the ends of a piece of work, the combination with a pattern-guided cutter having universal movement in a single plane, of a work holder reversible to present opposite ends of the work to the cutter.

2. In a machine for shaping the ends of a piece of work, the combination with a pattern-guided cutter having universal movement in a single plane, of a pivoted work holder arranged to turn to present opposite ends of the work to the cutter.

3. In a machine for shaping the ends of a piece of work, the combination of a cutter, a follower operatively connected therewith to guide the cutter, and a work and pattern holder in common reversible to present opposite ends of the work and the pattern to the cutter and follower respectively.

4. In a machine for shaping the ends of a piece of work, the combination of a cutter, a follower operatively connected therewith to guide the cutter, and a pivoted work and pattern holder in common arranged to turn to present opposite ends of the work and pattern to the cutter and follower respectively.

5. In a wood working machine, the combination of a work and pattern holder arranged to hold the work and pattern side by side, and movable in one plane, a cutter, a follower operatively connected therewith to guide the cutter according to the movement of the follower, means to drive the cutter, and means to move the follower and cutter around and in contact with the pattern and work respectively, including a support for both the follower and the cutter having pattern-controlled movement in a plane at an angle to the plane of movement of the work and pattern holder.

6. In a wood working machine, the combination of a work and pattern holder constructed to hold the work and pattern side by side and movable in one plane, a rotary cutter with its axis disposed parallel to said plane, a follower operatively connected therewith to guide the cutter according to the movement of the follower, means to rotate the cutter, a support for the follower and cutter, having universal movement in a plane at an angle to said plane, and means to move said support to cause the follower to follow the pattern and the cutter to act on the work accordingly.

7. In a wood working machine, the combination of a work and pattern holder constructed to hold the work and pattern side by side and movable in a plane lengthwise of the pattern, a rotary cutter and a follower, a support therefor movable universally in a plane at an angle to said plane, the cutter being operatively connected to the follower to copy the movement thereof, means to rotate the cutter, and means to move the follower in contact with the pattern.

8. In a wood working machine, the combination of a work holder in which the work is held without rotation, a rotary cutter the axis of which is located in endwise relation to the end of the work in the holder, the work holder having a feed movement parallel to the axis of the cutter and pattern-controlled means to move the cutter in a plane at an angle to its axis and around the end of the work as the work is fed.

9. In a wood working machine, the combination of a work holder movable in one plane parallel to the long axis of the work, in which the work is held without rotation, a rotary cutter spindle the axis of which is parallel to said plane and located in endwise relation to the end of the work in the holder, the holder having a feed movement parallel to the axis of the cutter and pattern controlled means to move the cutter spindle in a plane at a right angle to its axis and around the end of the work.

10. In a wood working machine, the combination of a holder having means to hold a pattern and a plurality of pieces of work in parallel relation, cutters corresponding in number and position to the pieces of work, and having guide connections with each other, a follower operatively connected to the cutters to guide the same, said cutters and follower being in parallel relation, the holder having a feed movement parallel to the axis of the cutters and the follower and means to move the follower in contact with and around the pattern, whereby the cutters move in similar paths with respect to the work.

11. In a wood working machine, the combination of a holder movable in one plane and having means to hold a pattern and a plurality of pieces of work in parallel relation, rotary cutters corresponding in number and position to the pieces of work and having guide connections with each other for corresponding movement, a follower operatively connected to the cutters to guide the same, said cutters and follower being in parallel relation and universally movable in a plane at an angle to said plane, the holder having a feed movement parallel to the axes of the cutters and the follower and means to move the cutters and follower in their plane, and with the follower in contact with the pattern.

12. In a wood working machine, the combination with a rotary cutter, having universal movement in a single plane, of a work holder coöperating therewith and pivotally mounted on an axis at a right angle to that of the cutter to present either end of the work to the cutter and a sliding support for the work holder movable toward and from the cutter in a plane transverse to the axis of the work holder and parallel to the axis of the cutter.

13. In a last trimming machine, the combination with means to hold right and left lasts, of a pattern-controlled rotary cutter constructed and adapted to trim each last, means to rotate said cutters in opposite directions, and connecting means between said cutters to reverse their relative movements as controlled by the pattern.

14. In a last trimming machine, the combination with means to hold right and left lasts, of a pattern-controlled rotary cutter constructed and adapted to trim each last, means to rotate said cutters in opposite directions, and connecting means between said cutters to reverse their relative movements as controlled by the pattern, said connecting means including slides upon which the respective cutters are mounted and an endless belt the opposite runs of which are connected to the slides respectively.

15. In a last trimming machine, the combination with means to hold a pattern last and right and left work-lasts of a follower arranged to coöperate with the pattern last, a cutter arranged to act on each work-last, means to drive the cutters, means to cause the follower to travel over the pattern, and means connecting the follower and the cutters to produce corresponding direct movement of one cutter and corresponding reverse movement of the other cutter.

16. In a last trimming machine, the combination with means to hold a pattern last and right and left work-lasts, of a follower arranged to coöperate with the pattern last, a rotary cutter arranged to act on each work-last, means to rotate the cutters in opposite directions, means to cause the follower to travel over the pattern, and means connecting the follower and the respective cutters to produce corresponding direct movement of one cutter and corresponding reverse movement of the other.

17. In a last trimming machine, the combination with means to hold a pattern last and right and left work-lasts, of a follower arranged to coöperate with the pattern last, a rotary cutter arranged to act on each work-last, means to rotate the cutters in opposite directions, means to cause the follower to travel over the pattern, and means connecting the follower and the respective cutters to produce corresponding direct movement of one cutter and corresponding reverse movement of the other, said means including a slide on which the follower and one cutter are mounted, a slide on which the other cutter is mounted, and reversing connections between said slides.

18. In a wood working machine, the combination of a work holder and a pattern holder, coöperating connected slides movable in parallel planes and at an angle to each other, a follower and a cutter mounted on one of said slides in position to coöperate with the pattern and act on work respectively, means tending to cause said slides to normally assume a position with the cutter and follower at central points, and means to move said slides to cause the follower to travel over the pattern.

19. In a wood working machine, the combination of a work holder and a pattern holder in parallel relation, coöperating slides mounted one upon the other and movable laterally at a right angle to each other in parallel planes, a follower and a cutter mounted on the upper slide in position to coöperate with the pattern and act on the work respectively, means connected to said slides tending to bring them to a normal position with the cutter and follower at central points, and means to move said slides to cause the follower to follow the pattern.

20. In a wood working machine, the combination of a work holder and a pattern holder, coöperating connected slides, movable in parallel planes at a right angle to each other, a follower mounted on one slide in position to coöperate with the pattern, a cutter mounted on another slide in position to act on the work, the two last mentioned slides being connected for corresponding movement, a spring tending to hold all of said slides in normal position with the cutter and follower at central points, and means acting upon said slides to cause the follower to travel on the pattern.

21. In a wood working machine, the combination of a support, a slide movable in one line thereon, another slide carried upon said slide and movable thereon at a right angle to said line, whereby composite movement of the upper slide is permitted, a follower and a cutter carried on the upper slide, a pattern holder and a work holder located in coöperative position with respect to said follower and cutter respectively, means connected to said slides tending to bring them to a certain central position, and means acting upon said slides to cause the follower to travel on the pattern.

22. In a wood working machine, the combination of a support, a lower slide movable back and forth thereon, front and rear slides mounted in guides upon said slide for movement at a right angle to the line of movement thereof, a cutter, and a follower carried by the front slide, a lever fulcrumed on the lower slide and connected at its opposite ends to the front and rear slides, a pattern holder and a work holder located in coöperative position with respect to the follower and cutter respectively, means connected to the rear slide tending to bring said slides to a normal central position, and means controlled by the pattern and connected to the rear slide to move said slides in directions proper to cause the follower to follow the pattern.

23. In a wood working machine, the combination of a support, a lower carrying slide 6 movable back and forth thereon, front slides 7 and 8 mounted for lateral movement on the slide 6 and having a reversing connection therebetween adapted to cause opposite movement, a rear slide 30 mounted for lateral movement on the slide 6, the lever fulcrumed on the slide 6 and connecting the slide 30 and one of the front slides, a spring connected to the slide 30 and tending to bring the slides to a central position, a follower and cutter carried by one of the front slides, a cutter carried by the other front slide, a holder for a pattern and a holder for right and left work pieces supported in position to coöperate with the follower and cutters respectively, and means connected to said slide 30 to move the slides in directions proper to cause the follower to travel around the pattern.

24. In a wood working machine, the combination of coöperating and connected slides movable at angles to each other in parallel planes, a rotary member for driving said slides, an automatically adjustable driving connection between said slides and the member, permitting angular variation of the slides with respect to the axis of said rotary member, a cutter carried by one of said slides, pattern-controlled means to produce such variation, and a spring connected to the slides and tending in opposition to the pattern to cause said slides to assume a central position.

25. In a wood working machine, the combination of a cutter-carrying device movable universally in a single plane, a ring gear rotatable in a parallel plane for driving said device, a driving connection between the gear and said device, including a swinging link which automatically adjusts itself to angular variations of the device with respect to the axis of the gear, pattern-controlled means to produce such variations as the device is driven, and yielding means resisting such variations.

26. In a wood working machine, the combination of a cutter-carrying device movable universally in a singe plane, a ring gear rotatable in a parallel plane for driving said device, a driving connection between the gear and said device, including a swinging link which automatically adjusts itself to angular variations of the device with respect to the axis of the gear, pattern-controlled means to produce such variations as the device is driven, and yielding means resisting such variations, and means to disconnect said link from said device.

27. In a wood working machine, the combination of a cutter-carrying device movable universally in a single plane, a ring gear rotatable in a parallel plane for driving said device, a transmitting connection between the gear and said device, including a stem projecting from one of the parts of the mechanism, a spring tending to hold said stem at the axis of the gear, a drag link pivoted to the gear and engaging the stem and arranged to swing to automatically adjust itself to lateral variations of the stem with respect to the axis of the gear, and pattern-controlled means to produce such variations in opposition to the spring.

28. In a wood working machine, the combination of cutter carrying slides movable angularly upon each other in parallel planes to permit universal movement of the cutter in a single plane, one of said slides having a depending stem, a ring gear extending around the stem, a link pivoted to the gear and engaging said stem and arranged to swing to automatically adjust itself to eccentric position of the stem with respect to the axis of the gear, a tension device connected to the stem and tending to hold the same at the axis of the gear, and pattern controlled means acting in opposition to said device to produce corresponding eccentric variations in position of the stem.

29. In a wood working machine, the combination of cutter-carrying slides movable angularly upon each other in parallel planes to permit universal movement of the cutter in a single plane, one of said slides having a depending stem, a ring gear extending around said stem, a drag link pivoted to the gear and engaging said stem and arranged to swing to automatically adjust itself to eccentric positions of the stem with respect to the axis of the gear, a wabbling tube having a supporting bearing at one end and engaging the stem at the other end, a spring connected to the tube and tending to hold the same in axial position with respect to the gear, and pattern-controlled means acting in opposition to said spring to vary the position of the stem laterally with respect to the axis of the gear.

30. In a wood working machine, the combination with a tool, of a work holder movable with respect thereto, and means to govern said movement during the operation of the tool on the work, including confined fluid and a valve controlling its flow.

31. In a wood working machine, the combination with a tool, of a work holder movable with respect thereto, and means to govern said movement during the operation of the tool on the work, including a cylinder containing fluid and a piston therein connected to the holder, and a valve controlling the flow of the fluid from the cylinder, whereby the movement of the piston is regulated.

32. In a wood working machine, the combination with a tool, of a work holder movable up and down toward the same, a piston connected to the work holder, a cylinder containing fluid and in which the piston works, a tank, a check valve opening from the tank to the cylinder, to allow quick movement of the fluid from the tank to the cylinder, a by-pass valve between the cylinder and tank to allow controlled movement of the fluid from the cylinder to the tank during the operation of the tool on the work, and means to operate said valve.

33. In a wood working machine, the combination with a tool, of a work holder movable with respect thereto, a confined body of fluid resisting said movement, a valve controlling the flow of said fluid, and a lever connected to said valve, and a cam bearing on the lever for slight movement and adjustment of the valve during the operation of the tool on the work, independent of the ordinary movement of the lever.

34. In a wood working machine, the combination of a cutter spindle a support therefor movable universally in a plane at a right angle to its axis, pattern-controlled means to automatically produce such movement, and means to rotate the spindle.

35. In a wood working machine, the combination of a cutter spindle, slides movable in parallel planes one upon and at a right angle to the other, the cutter spindle being mounted upon one slide, and means to drive said spindle, including a pulley mounted on the other slide.

36. In a wood working machine, the combination of a plurality of cutter spindles, laterally movable slides upon which said spindles are mounted, a longitudinally movable slide upon which said slides are carried, pulleys mounted on the last mentioned slide, means to drive the same, and belts connecting said pulleys and the respective cutter spindles.

37. In a wood working machine, the combination of a cutter spindle movable universally in a plane at an angle to its axis, and means to drive the spindle, including a belt and pulleys, the distance between the pulleys being variable according to the movement of the spindle in said plane, and a belt tightener engaging the belt and yieldable to accommodate the angular movement of the spindle.

38. In a wood working machine, the combination of a standard, a work and pattern holder movable up and down thereon, the work pattern being held side by side, pattern-controlled mechanism movable in a horizontal plane on top of the standard, and a rotary cutter and follower carried by said mechanism and located side by side in position to act on the work and coöperate with the pattern, the axes of said cutter and follower being vertical and parallel.

In testimony whereof, I affix my signature in presence of two witnesses.

ARTHUR B. NORRIS.

Witnesses:
   N. P. SANFORD,
   E. M. COURTNEY.